US012623634B2

(12) United States Patent　　　　　(10) Patent No.:　US 12,623,634 B2

Roth　　　　　　　　　　　　　　　　　(45) Date of Patent:　May 12, 2026

(54) SYSTEMS AND METHODS FOR SWITCHING GEARS IN MULTIPLE-SPEED LANDING GEAR

(71) Applicant: EZ Winder, LLC, Memphis, TN (US)

(72) Inventor: Terry Roth, Austin, TX (US)

(73) Assignee: EZ WINDER, LLC, Memphis, TN (US)

( * ) Notice: Subject to any disclaimer, the term of this patent is extended or adjusted under 35 U.S.C. 154(b) by 420 days.

(21) Appl. No.: 18/143,246

(22) Filed: May 4, 2023

(65) Prior Publication Data

US 2024/0367622 A1　Nov. 7, 2024

(51) Int. Cl.
　　*B60S 9/06*　　　(2006.01)
　　*B66F 3/20*　　　(2006.01)
(52) U.S. Cl.
　　CPC . *B60S 9/06* (2013.01); *B66F 3/20* (2013.01)

(58) Field of Classification Search
　　CPC .......... B60S 9/02–08; B60S 9/14; B60S 9/16; B60S 9/18; B66F 3/20
　　See application file for complete search history.

(56) References Cited

U.S. PATENT DOCUMENTS

2001/0054815 A1* 12/2001 Baird ........................ B60P 1/56
　　　　　　　　　　　　　　　　　　　　　280/763.1

* cited by examiner

*Primary Examiner* — Tyrone V Hall, Jr.
(74) *Attorney, Agent, or Firm* — Thomas | Horstemeyer, LLP

(57)　　　　　　ABSTRACT

Disclosed are various embodiments of an automated system for moving an input shaft associated with landing gear of a platform, for example, a trailer or ramp, along its longitudinal axis in order to switch gears. One such system, among others, has a controller that is electrically coupled to a gear shifter. The controller is capable of causing the gear shifter to move the landing gear input shaft in first and second opposing longitudinal directions in order to shift between the gears. The gear shifter may implement the longitudinal movement via a linear actuator, solenoid actuator, or other suitable device.

17 Claims, 9 Drawing Sheets

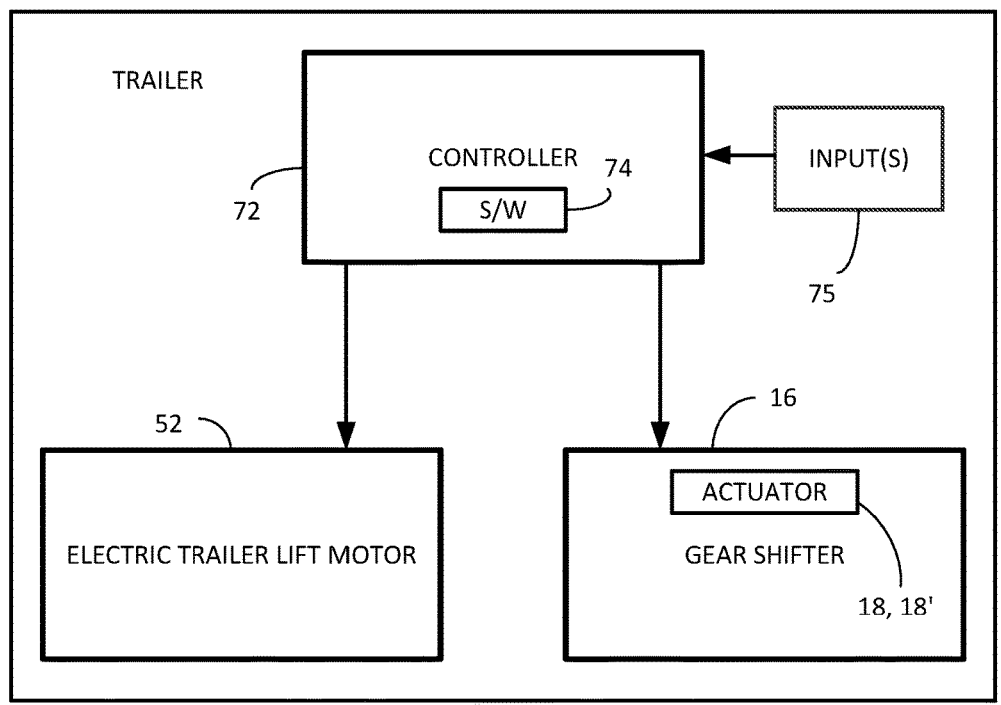
FIG. 4A
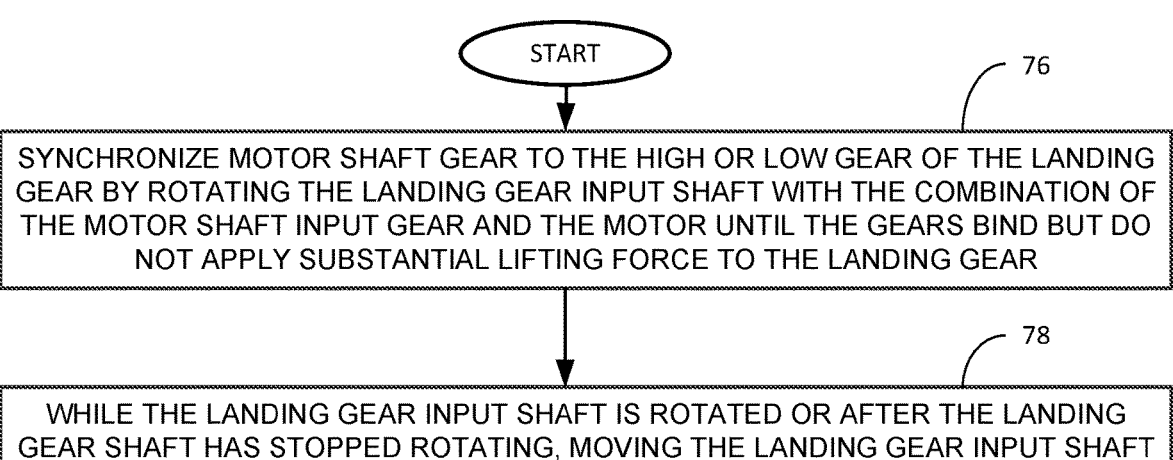
FIG. 4B
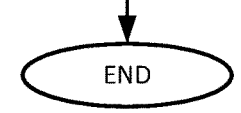

SYSTEMS AND METHODS FOR SWITCHING GEARS IN MULTIPLE-SPEED LANDING GEAR

FIELD OF THE INVENTION

The present invention relates generally to an automated system for operating landing gear associated with a movable platform, such as a trailer, ramp, etc., and more particularly, to systems and methods for switching gears in landing gear having multiple speeds.

BACKGROUND OF THE INVENTION

Many trailers have front landing gear for vertical support of the front of the trailer when the tractor, or truck, is detached. Such landing gear has at least one, but generally two, telescoping or jack-type landing gear legs and corresponding feet that extend downwardly from the floor or frame of the trailer, bolted, clamped or welded. Each leg is operatively attached to a screw and follower or a rack and pinion gear arrangement, which is in turn driven by a landing gear shaft that extends between the legs and which causes extension or retraction of the legs and feet depending on the direction in which it is rotated. It is typically rotated manually by a person with a crank handle that is attached to an input shaft, or shift shaft.

Heavy duty 5$^{th}$ wheel, gooseneck, and class 5 hitch/pintle mount trailers, such as large utility, dump, flatbed, deckover, and specialty trailers, have 10,000 lb. to 35,000 lb. lifting capacity landing gear with a single or dual landing gear configuration and single or dual speed crank to achieve the lift rating necessary to raise or lower the front of the trailer to the necessary height for attaching the trailer to a tow vehicle.

Then there are the heavier duty OTR (over the road) heavier duty commercial and industrial trailers that carry an astounding GVWR rating up to 60,000 lbs and in some cases 80,000 lbs or more with DOT exemptions. This heavy weight makes these trailers particularly hard to raise and tiresome to lower when loaded, using the manually operated crank handle.

The need for landing gear cranking assistance is imperative as many of these trailers have single speed landing gear that makes it almost impossible to crank when loaded. Even trailers with a two speed landing gear setup still require the need to crank the landing gear, putting undue strain on one's shoulder, arm, and back. With aging drivers/owners, this can create health, safety problems and over time, forcing driver/owners to retire early or reduce the number of jobs they can take on. For the younger trailer owners, they want things simpler and with less strenuous work.

There are some existing options available to assist owners and alleviate strain on cranking landing gears on less than 60,000 lb. trailers.

One option is to install a Bulldog 12,000 lb. landing gear motor that requires the change out of the main pinion gear and input shaft to install the motor and is limited to 12,0000 lb. load.

Another option is to install a full hydraulic landing gear system that requires specialized hydraulic landing gear, hydraulic pumps, and hydraulic lines that require continuous maintenance and complex installation.

Yet another option is to install a pneumatic landing gear system that requires an electric air pump, air canister, and specialty landing gear or motor.

Finally, still another option is to install a motorized system. As examples, an electric motorized system is described in U.S. Pat. No. 10,807,571 and in application No. 63/343,240, filed May 18, 2022, which are incorporated herein by reference in their entirety and which involve attaching a small electric lift motor with gearbox to the input shaft of the landing gear of the trailer. The aforementioned electric motorized systems are capable of working on trailers with landing gear rated from as low as 10,000 lbs. to as high as 65,000 lbs. or more. Furthermore, these motorized systems are commercially available for purchase from EZ-Winder, LLC, Memphis, Tennessee, U.S.A., the assignee of the present application.

Furthermore, some designs of landing gear have multiple speeds of operation involving multiple gears, e.g., a high gear and a low gear. Typically, the input shaft is manually moved along its longitudinal axis (either inward or outward, depending upon the design) in order to switch between a high gear and a low gear for slower and faster speeds, respectively. When in high gear, the input shaft can be rotated with lower torque than when in low gear. When in low gear, the input shaft can be rotated with higher torque than when in high gear.

The landing gear is usually in its low gear, or the high speed position, as this is the gear used when the landing gear is off the ground or just touching the ground and not needing to be extended further.

When a person, such as a truck driver, needs to hook onto or pick up a trailer and the height of the trailer is too low or too high, then the driver must first switch from low gear to high gear by manually move the landing gear input shaft, inwardly or outwardly, because most landing gear manufacturers recommend putting the landing gear in high gear before cranking the landing gear when the landing gear foot is on the ground in order to keep from damaging the landing gear shaft(s), gear teeth, and other components.

Landing gear technology is also implemented in connection with other types of vertically movable platforms. For instance, ramps are sometimes used to load and unload trailer. Some can enable forklifts to enter and exit a trailer. Furthermore, some of the ramp designs are equipped with landing gear to enable them to be raised and lowered.

SUMMARY OF THE INVENTION

Various embodiments are disclosed for moving in an automated manner an input shaft associated with landing gear of a platform, for example, a trailer, ramp, etc., along its longitudinal axis in order to shift gears. The landing gear has at least two speeds with high and low gears that are changed when the input shaft is longitudinally moved.

One embodiment, among others, can be summarized as follows. A gear shifter is provided for moving the input shaft along its longitudinal axis. A controller is further provided that is electrically coupled to the gear shifter. The controller is capable of causing the gear shifter to move the landing gear input shaft in first and second opposing longitudinal directions in order to shift between the gears. The gear shifter may implement the longitudinal movement via a linear actuator, solenoid actuator, or other suitable device.

In another embodiment, among others, the landing gear is further equipped with a lift motor (e.g., electric, pneumatic, hydraulic, etc.) that rotates the landing gear input shaft, and the controller is electrically coupled to the lift motor. The controller is capable of causing the lift motor to rotate in first and second opposing rotational directions.

Other embodiments, systems, apparatus, methods, features, and advantages of the present invention will be or become apparent to one with skill in the art upon examination of the following drawings and detailed description. It is intended that all such additional embodiments, systems, apparatus, methods, features, and advantages be included within this description, be within the scope of the present invention, and be protected by the accompanying claims.

BRIEF DESCRIPTION OF THE DRAWINGS

Many aspects of the disclosure can be better understood with reference to the following drawings. The parts in the drawings are not necessarily to scale, emphasis instead being placed upon clearly illustrating the principles of the present disclosure. Moreover, in the drawings, like reference numerals designate corresponding parts throughout the several views.

FIG. 1 illustrates a first embodiment of a system for switching gears with a linear actuator in multiple-speed landing gear that is either unmotorized, or alternatively, motorized with an internal lift motor (not shown) for raising and lowering the trailer. Specifically.

FIG. 2 illustrates a second embodiment of a system for switching gears with a linear actuator in motorized multiple-speed landing gear having the electric lift motor and an adjustable motor mount with a movable bracket that attaches to and moves the electric lift motor. Specifically.

FIG. 3 illustrates a third embodiment of a system for switching gears with a solenoid actuator in motorized multiple-speed landing gear for raising and lowering the trailer. Specifically.

FIG. 4 illustrates an embodiment of an electrical system for operating any one of the systems described in FIGS. 1-3. Specifically, FIG. 4A is a block diagram showing the parts and connections. FIG. 4B is a flow chart showing the control and operation of the parts.

DETAILED DESCRIPTION OF THE PREFERRED EMBODIMENT(S)

Figure 1A:
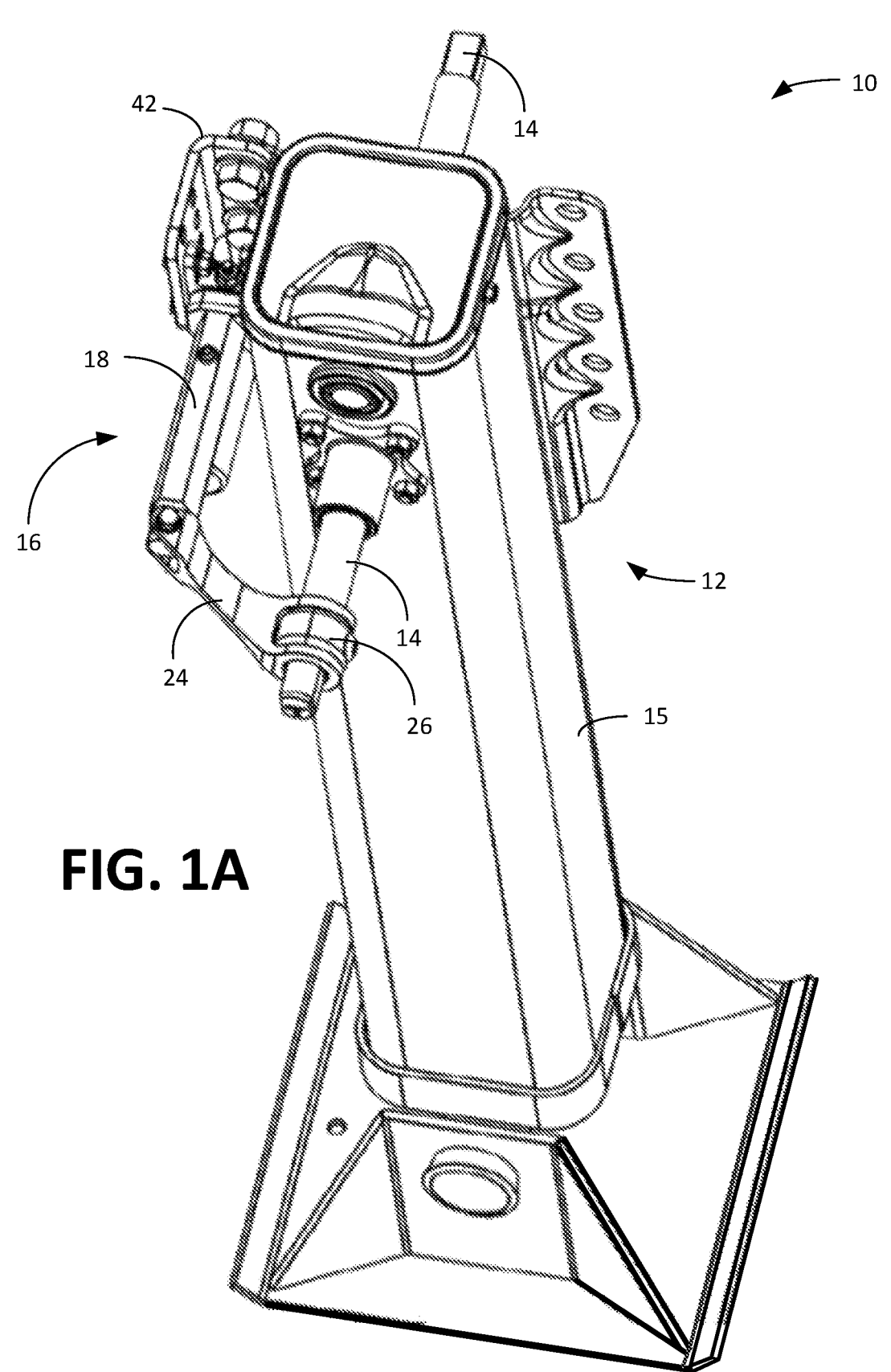
FIG. 1A is a front perspective view.
Figure 1B:
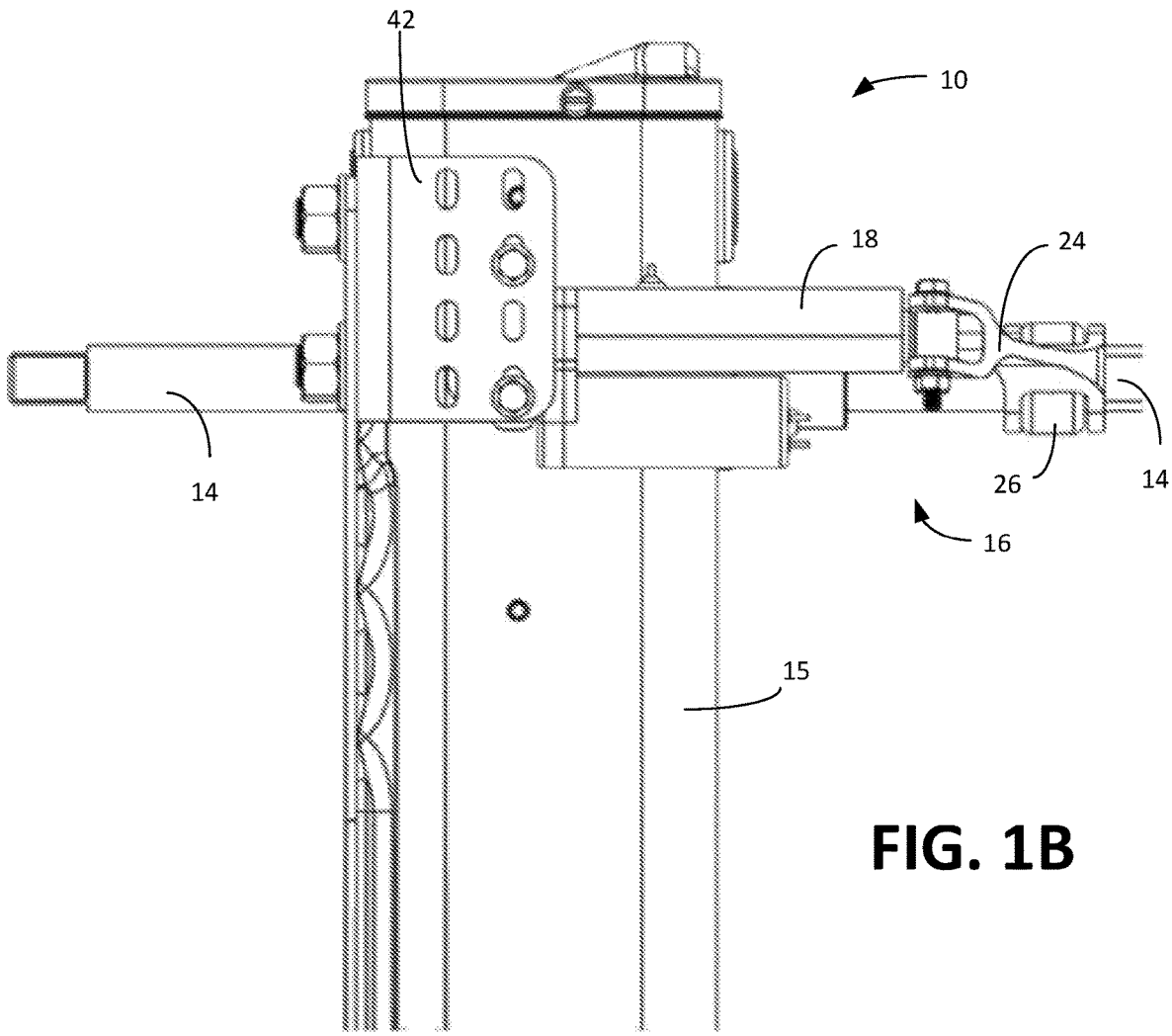
FIG. 1B is a left side view.
Figure 1C:
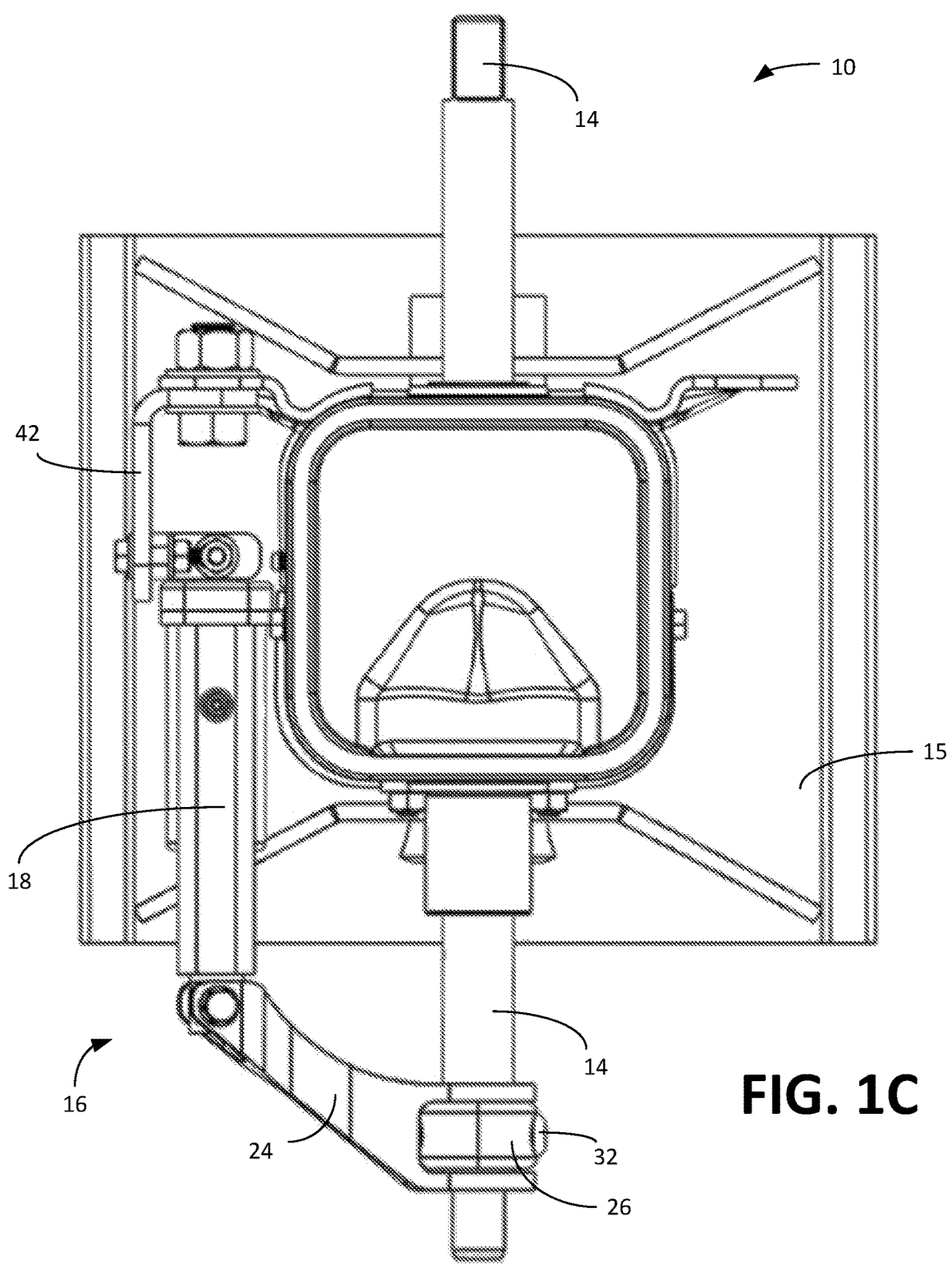
FIG. 1C is a top view.
Figure 1D:
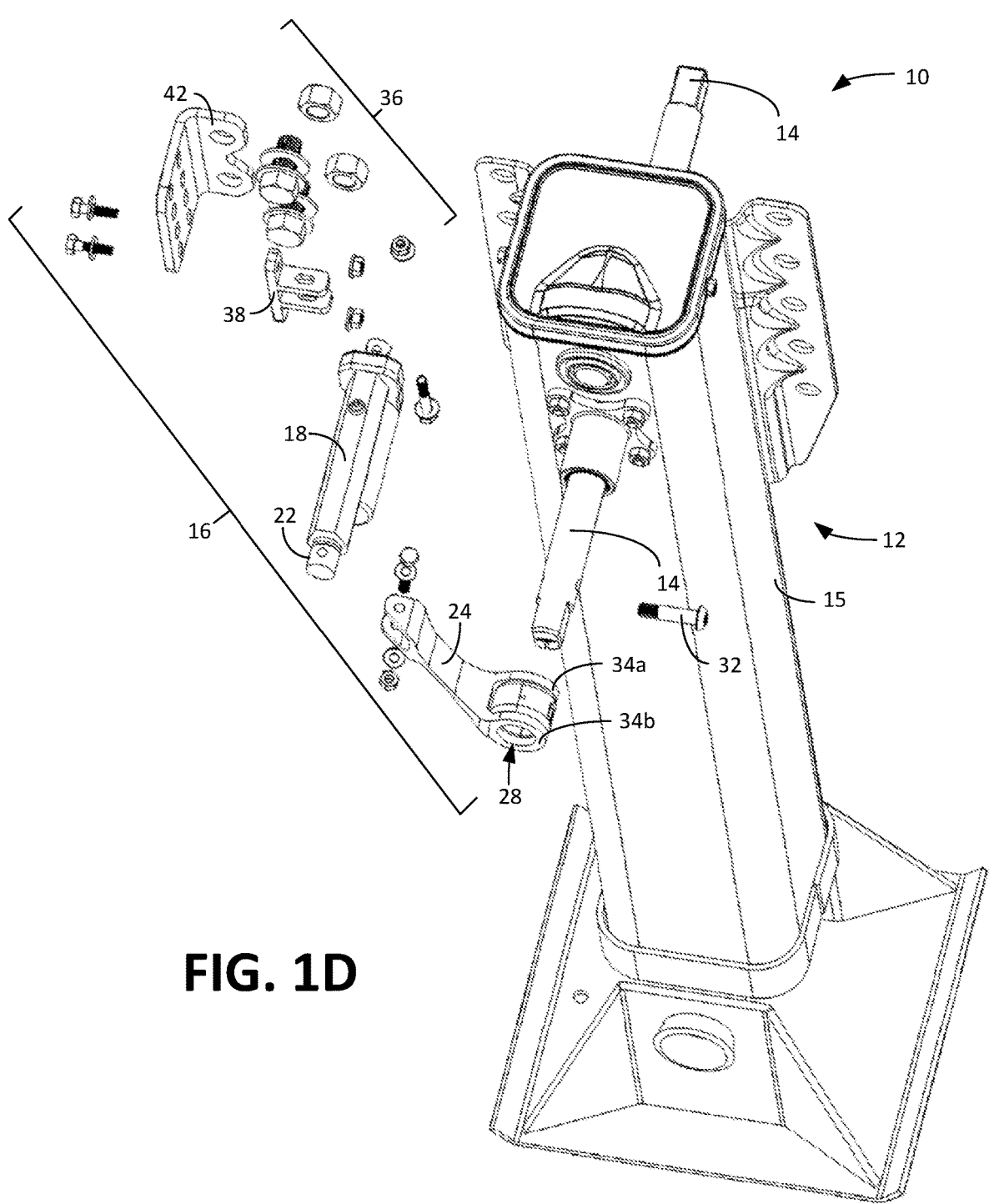
FIG. 1D is an assembly view showing the mechanical parts and how they are assembled.

FIG. 1 illustrates a first embodiment of a system, denoted by reference numeral 10, for switching gears in multiple-speed landing gear 12 that is unmotorized or motorized with a lift motor (not shown) for rotating an input shaft 14 for the purpose of raising and lowering a vertically movable platform, for example, a trailer, ramp, etc. Furthermore, the lift motor can be internal or external (near the distal end of the input shaft 14) and the lift motor can be implemented by way of electric, pneumatic, and/or hydraulic means. Specifically, with reference to the figures, FIG. 1A is a front perspective view of the system 10. FIG. 1B is a left side view of the system 10. FIG. 1C is a top view of the system 10. FIG. 1D is an assembly view of the system 10, showing the mechanical parts and how they are assembled.

The system 10 is designed to rotate and longitudinally move an input shaft 14 associated with landing gear 12 of a platform, such as a trailer, ramp, etc. The landing gear 12 has at least one telescoping jack leg 15 for raising and lowering the platform when the input shaft 14 is rotated. The landing gear 12 has multiple speeds with multiple gears (e.g., two speeds with high and low gears) that are changed when the input shaft 14 is moved along its longitudinal axis, i.e., inwardly or outwardly. In many commercially available designs of the landing gear 12, the input shaft 14 needs to longitudinally move between about ½ inch to about 1 inch.

The system 10 includes a gear shifter 16. The gear shifter 16 has a linear actuator 18, which in the preferred embodiment is a commercially available device. The linear actuator 18 has a movable reciprocating piston 22. The piston 22 has an elongated body with a movable reciprocating working end and a driven end. The linear actuator 18 is designed to move the driven end of the piston 22 in a longitudinal direction generally parallel to the longitudinal axis of the landing gear input shaft 14. The mechanism for creating the driving force can be, for example but not limited to, a direct current (DC) electric motor (e.g., an electric stepping motor), solenoid, pneumatic, hydraulic, etc.

A mechanical mechanism, or linkage, is provided for mechanically connecting the movable working end of the piston 22 to the input shaft 14 so that the input shaft 14 is movable along the longitudinal axis as the linear actuator 18 moves the piston 22. In the system 10, this mechanism is an input shaft capture arm 24 that attaches the movable working end of the piston 22 to the landing gear input shaft 14.

The input shaft capture arm 24 includes a rotatable bushing 26 having a cylindrical peripheral side, right and left sides, and a throughway 18 extending between the right and left sides. The bushing 26 is situated about the landing gear input shaft 14 so that the landing gear input shaft 14 extends through the bushing throughway 18. A screw 32 extends through the cylindrical peripheral side into the landing gear input shaft 14 that secures the bushing 26 to the input shaft 14 so that the bushing 26 rotates when and with the input shaft 14 when the input shaft 14 rotates. The bushing permits the input shaft 14 to freely rotate as well as be moved along the input shaft longitudinal axis by the gear shifter 16.

A nonrotating bushing support 34 having left and right eyehole securing members 34a, 34b at the left and right sides of the capture arm 24, respectively, is provided. The bushing support 34 permits rotation of the bushing 26 and the input shaft while confining the bushing 26 in the longitudinal direction.

A gear shifter mount 36 mounts the gear shifter 16 to a part of the trailer, such as the landing gear 12 or trailer frame, and prevents movement of the gear shifter 16 relative to the input shaft 14. In the system 10, the gear shifter mount 36 includes a linear actuator pivoting bracket 38 attached to the actuator 18 via a suitable fastener, such as a screw/nut arrangement, to enable the actuator to slightly pivot horizontally. The gear shifter mount 36 further includes an L-bracket 42 that attaches the pivoting bracket 38 to the landing gear 12. This attachment is accomplished with suitable fasteners, such as screw/nut arrangements, as shown.

It should be noted that the gear shifter 16 can be implemented on motorized landing gear wherein a motor (with or without a gearbox) is situated between the landing gear 12, or leg 15, and the bushing 126.

Figure 2A:
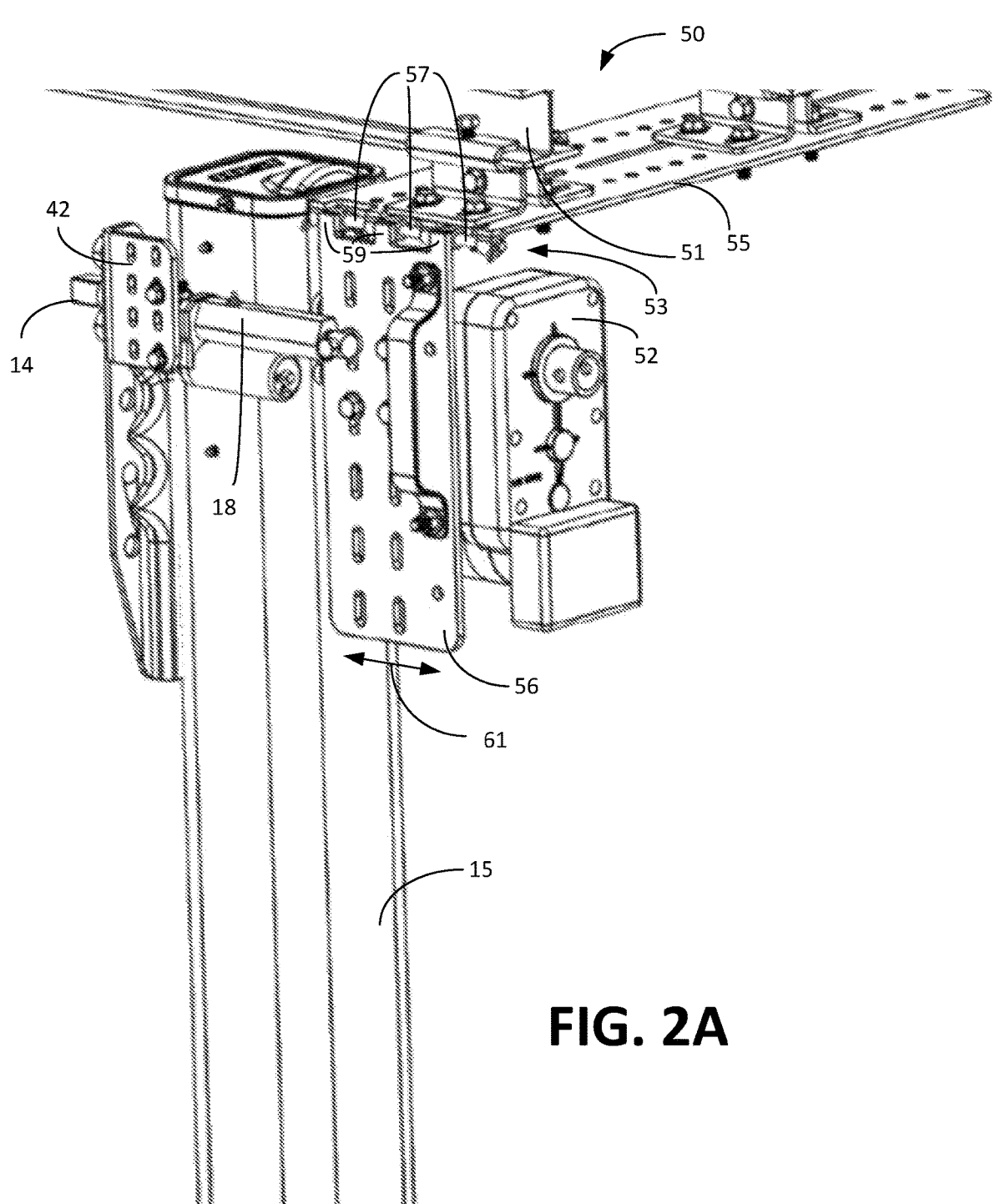
FIG. 2A is a front perspective view.
Figure 2B:
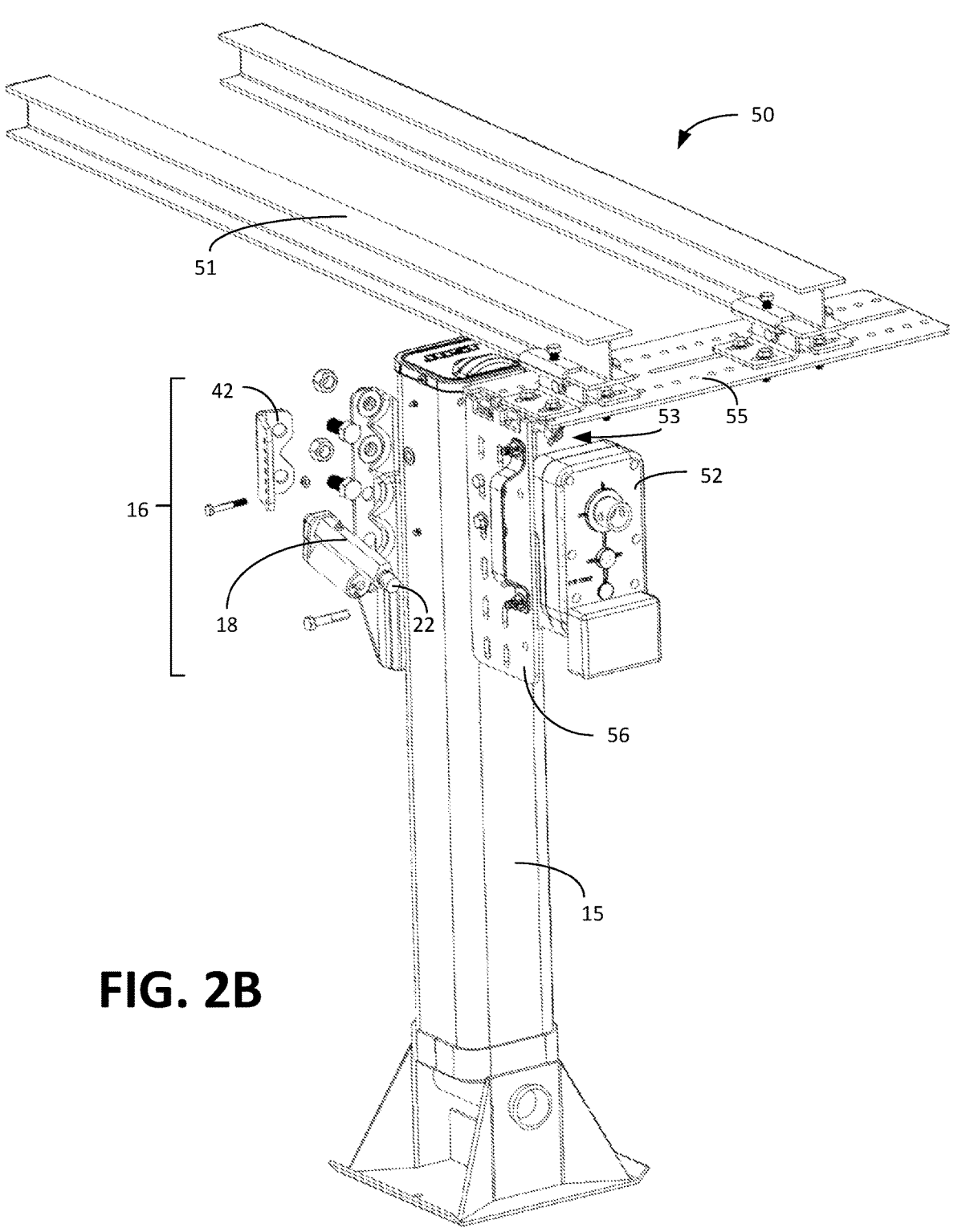
FIG. 2B is an assembly view showing the mechanical parts and how they are assembled.

FIG. 2 illustrates a second embodiment of a system, denoted by reference numeral 50, for switching gears in motorized multiple-speed landing gear 12 having an electric lift motor 52 (with gearbox) and an adjustable motor mount 54 with a movable bracket attached to the electric lift motor 52, which is described in U.S. Pat. No. 10,807,571 as well as the inventor's application No. 63/343,240, filed May 18, 2022, for raising and lowering the platform 51. Other adjustable motor mounts with movable motor brackets that can be used in the system 50 are described in detail in the inventor's application Ser. No. 17/889,638, filed Aug. 17, 2022, which is incorporated herein by reference, for raising and lowering the platform 51. Specifically, FIG. 2A is a front perspective view of the system 50. FIG. 2B is an assembly view of the system 50, showing the mechanical parts and how they are assembled.

The system 50 is designed to rotate and longitudinally move an input shaft 14 associated with landing gear 12 of the platform 51. The landing gear 12 has multiple speeds with multiple gears (e.g., two speeds with high and low gears) that are changed when the input shaft 14 is moved along its longitudinal axis, i.e., inwardly or outwardly.

The system 50 includes a gear shifter 16. The gear shifter 16 has a linear actuator 18. The linear actuator 18 has a movable reciprocating piston 22. The piston 22 has an elongated body with a movable reciprocating working end and a driven end. The linear actuator 18 is designed to move the driven end of the piston 22 in a longitudinal direction generally parallel to the longitudinal axis of the landing gear input shaft 14. The mechanism for creating the driving force can be, for example but not limited to, a DC motor, solenoid, etc.

A mechanical mechanism, or linkage, is provided for mechanically connecting the movable working end of the piston 22 to the input shaft 14 so that the input shaft 14 is movable along the longitudinal axis as the linear actuator 18 moves the piston 22. In the system 50, this mechanism includes a flat vertical movable bracket 56 connected to and capable of moving the electric lift motor 52. The movable bracket 56 is connected via a sliding hinge mechanism 53 to a flat horizontal bracket 55. The sliding hinge structure 53 includes a pin 57 secured to the horizontal bracket 55. The movable bracket 56 hangs on the pin 57 via a plurality of knuckles, or barrels, 59, and is longitudinally movable along the pin 57 as indicated by the reference arrow 61 in FIG. 2B. In effect, the brackets 55, 56 are each similar to a leaf of a conventional hinge.

The movable bracket 56 is also attached to the movable working end of the piston 22 via a suitable fastener, such as a screw/nut arrangement, as shown. The electric lift motor 52 is connected to the input shaft 14. When the working end of the piston 22 is linearly moved with the linear actuator 18, the combination of the bracket 56, the electric lift motor 52, and input shaft 14 are moved so that the input shaft 14 is moved along its longitudinal axis.

The gear shifter mount 36 of the system 50 includes a bracket 42, for example, an L-shaped bracket 42, that attaches the linear actuator 18 to a part of the platform 51, such as the landing gear 12 or the trailer frame. This attachment is accomplished with suitable fasteners, such as screw/nut arrangements, as shown. There are other bracket mounting possibilities.

It should be noted that the electric lift motor 52 (with gearbox) is a nonlimiting example of a motor implementation. The gear shifter 16 with linear actuator 18 can be used in connection with many other possible motor implementations, motor types, and movable motor mount bracket implementations.

Figure 3A:
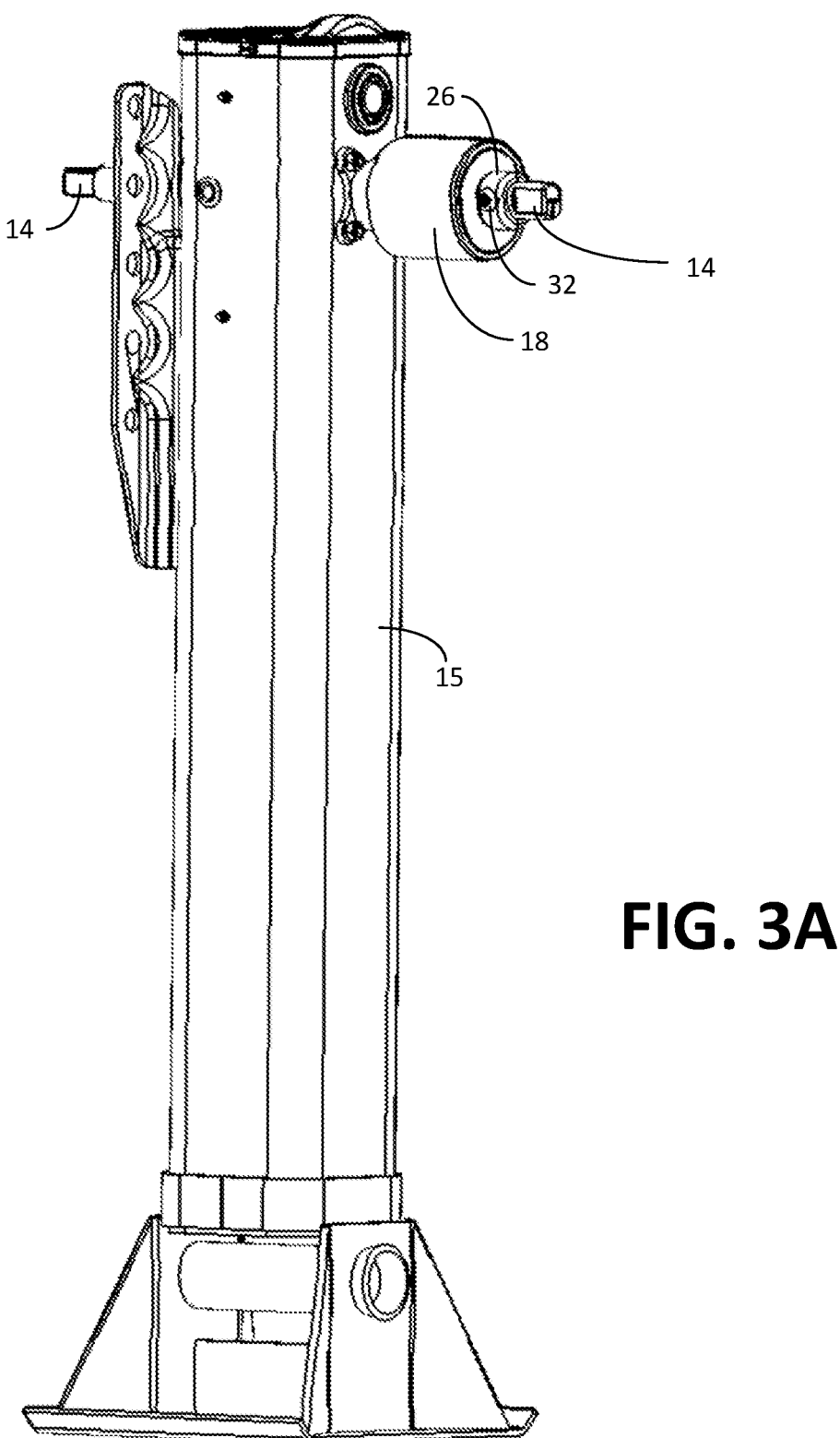
FIG. 3A is a front perspective view.
Figure 3B:
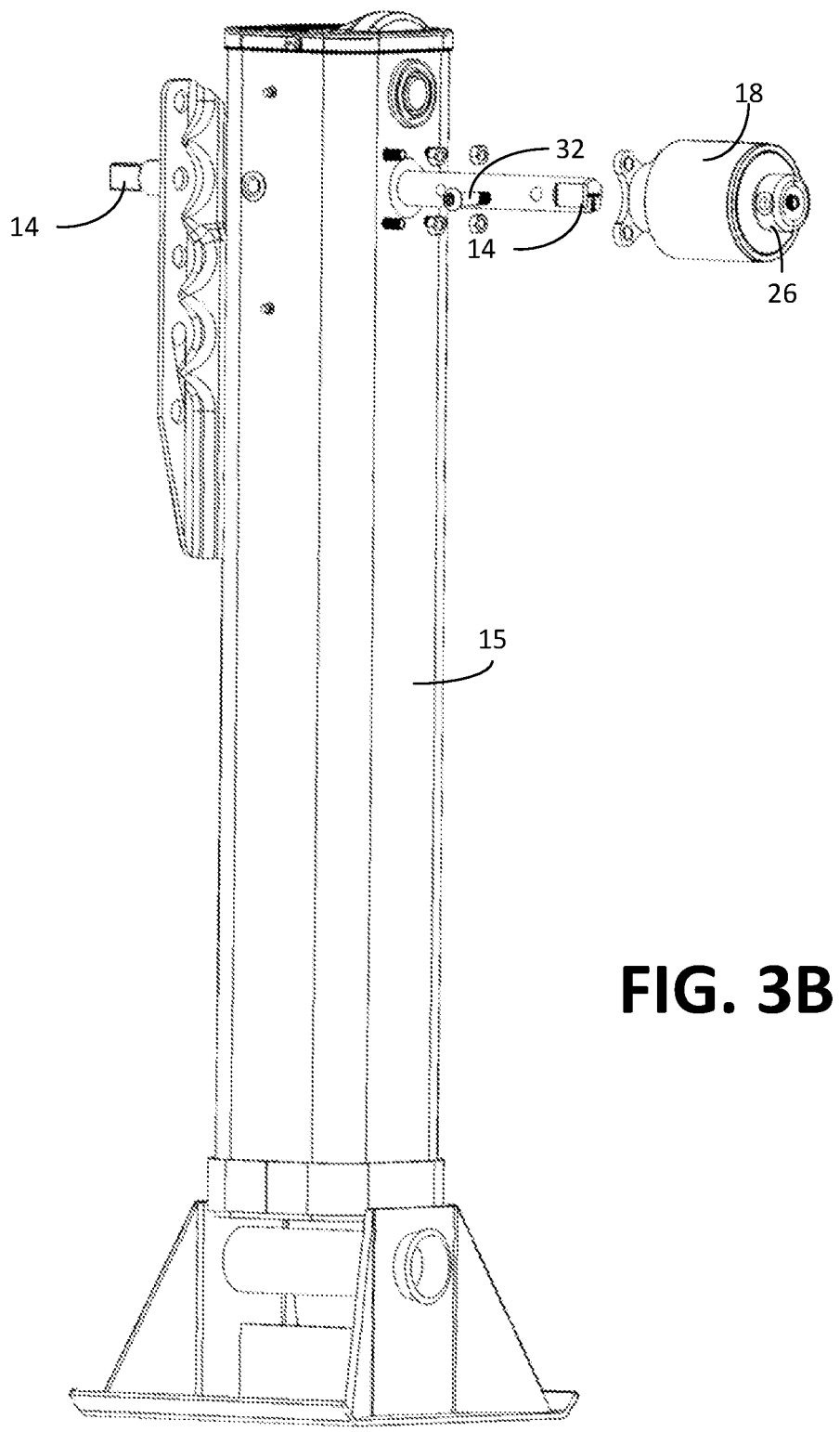
FIG. 3B is an assembly view showing the mechanical parts and how they are assembled.

FIG. 3 illustrates a third embodiment of a system, denoted by reference numeral 60, for switching gears in motorized multiple-speed landing gear 12 having solenoid actuator 18' for raising and lowering the platform 51. Specifically, FIG. 3A is a front perspective view of the system 60. FIG. 3B is an assembly view of the system 60 showing the mechanical parts and how they are assembled. In this example, the landing gear 12 has an internal electric lift motor (not shown).

The solenoid actuator 18' has a cylindrical throughway extending from a first side to a second side. The input shaft 14 extends through and is capable of freely rotating within the throughway. The solenoid actuator 18' is mounted to a part of the landing gear 12, such as the leg 15, as shown, with suitable fasters, such as screw/nut arrangements in order to prevent rotation of the solenoid actuator 18'. The solenoid actuator 18' is situated horizontally between a mounted location at the landing gear 12 and the bushing 26 with screw 32 therein. The input shaft is movable in opposing first and second directions along its longitudinal axis by the solenoid actuator 18' acting upon the input shaft within the throughway using a magnetic field.

FIG. 4 illustrates an embodiment of an electrical system for operating any one of the mechanical systems 10, 50, or 60 described in FIGS. 1-3. Specifically, FIG. 4A is a block diagram showing the parts and connections. FIG. 4B is a flow chart showing the control and operation of the parts.

As shown in FIG. 4, a controller 72 is electrically coupled to the electric lift motor 52 and the linear actuator 18 of the gear shifter 16. The controller 72 is capable of causing the electric lift motor 52 to selectively rotate in first and second opposing rotational directions. The controller is also capable of causing the gear shifter 16 to selectively move the landing gear input shaft 14 in first and second opposing longitudinal directions in order to shift between high and low gears. The controller 72 can control the extension and retraction distances of the piston 22 associated with the linear actuator 18.

As illustrated in FIG. 4B, in the preferred embodiment, the controller 72 is designed to, as indicated by reference numeral 76, synchronize a motor shaft gear(s) to the high gear or the low gear of the landing gear 12 by rotating the landing gear input shaft 14 with the combination of the motor shaft gear(s) and the motor 52 until the foregoing gears bind but do not apply substantial lifting force to the landing gear 12. Then, as indicated by reference numeral 78, while the landing gear input shaft 14 is rotating or after the landing gear input shaft 14 has stopped rotating, the controller 72 moves the landing gear input shaft 14 with the gear shifter 16 in the longitudinal direction either inwardly or outwardly in order to shift between the high gear and the low gear.

The controller 72 can be implemented with any of a number of suitable devices, for example but not limited to, a commercially available microcontroller unit (MCU) or a microprocessor unit (MPU), etc., which typically employs software 74 that is executed for controlling the operations. The controller 72 can also implemented solely with hardware, if desired, such as a plurality of switches or an electrical circuit.

It should be emphasized that the above-described "embodiments" of the present invention, particularly, any "preferred" embodiments, are merely possible nonlimiting examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure.

As an example of a variation, the linear actuator 18 and the solenoid actuator 18' could be replaced with a nonlinear actuator with different mechanical connecting linkage to move the input shaft 14 in a linear manner longitudinally when operated.

As another example of a variation, the electric lift motor 52 can be replaced with a suitable pneumatic or hydraulic driven lift motor.

As another example of a variation, the electric motor 52 and related mechanical linkage to the input shaft can be replaced with a pneumatic or hydraulic lift mechanism.

As another example of a variation, the system for longitudinally moving an input shaft associated with landing gear of a trailer can be implemented in connection with landing gear associated with any type of movable platform (e.g., a ramp that can be used to enter and exit a trailer).

The invention claimed is:

1. A system for rotating and longitudinally moving an input shaft of landing gear associated with a movable platform, the landing gear having a telescoping jack leg for raising and lowering the platform when the input shaft is rotated, the landing gear having two speeds with high and low gears that are changed when the input shaft is moved along its longitudinal axis, the system comprising:

a lift motor that rotates the landing gear input shaft;

a gear shifter, the gear shifter having:

a linear actuator, the linear actuator having a reciprocating piston, the piston having an elongated body with a movable working end and a driven end, the linear actuator is designed to move the driven end of the piston in a longitudinal direction generally parallel to the longitudinal axis of the landing gear input shaft; and means for mechanically connecting the movable working end of the piston to the input shaft so that the input shaft is movable along the longitudinal axis as the linear actuator moves the piston;

wherein the input shaft capture arm further comprises:

a rotatable bushing having a cylindrical peripheral side, right and left sides, and a throughway extending between the right and left sides, the bushing situated about the landing gear input shaft so that the landing gear input shaft extends within the throughway;

a screw extending through the cylindrical peripheral side into the landing gear input shaft that secures the bushing to the input shaft so that the bushing rotates when the input shaft rotates, the bushing permitting the input shaft to rotate as well as be moved along its longitudinal axis by the gear shifter;

a nonrotating bushing support having left and right eyehole securing members at the left and right sides, respectively, of the bushing that permit rotation of the bushing and the input shaft while confining the bushing in the longitudinal direction; and wherein the connecting means comprises an input shaft capture arm that attaches the movable working end of the piston to the landing gear input shaft.

2. The system of claim 1, wherein the connecting means comprises a movable bracket being connected to the lift motor, the movable bracket being attached to the movable working end of the piston, the lift motor being connected to the input shaft, and wherein when the working end is moved with the linear actuator, the combination of the bracket, the lift motor, and input shaft are moved.

3. The system of claim 1, further comprising a controller that is electrically coupled to the lift motor and a solenoid of the gear shifter, the controller capable of causing the lift motor to rotate in first and second opposing rotational directions, the controller capable of causing the gear shifter to move the landing gear input shaft in first and second opposing longitudinal directions in order to shift between high and low gears.

4. The system of claim 1, wherein the controller is designed to:

synchronize a motor shaft gear to the high or low gear of the landing gear by rotating the landing gear input shaft with the combination of the motor shaft gear and the motor until the gears bind but do not apply substantial lifting force to the landing gear; and while the landing gear input shaft is rotating or after the landing gear shaft has stopped rotating, moving the landing gear input shaft with the shifter in the longitudinal direction either inwardly or outwardly in order to shift between the high and low gears.

5. The system of claim 1, further comprising a gear shifter mount that mounts the gear shifter to the platform and that prevents movement of the gear shifter relative to the input shaft.

6. The system of claim 1, further comprising the platform with the landing gear with the telescoping jack leg for raising and lowering the platform when the input shaft is rotated.

7. A system for longitudinally moving an input shaft associated with landing gear of a platform, the landing gear having a telescoping jack leg for raising and lowering a front of the platform when the input shaft is rotated, the landing gear having gears that are changed when the input shaft is moved along its longitudinal axis, the system comprising:

gear shifter means for moving the input shaft along its longitudinal axis; and a controller that is electrically coupled to the gear shifter means, the controller capable of causing the gear shifter means to move the landing gear input shaft in first and second opposing longitudinal directions in order to shift between the gears;

wherein the input shaft capture arm further comprises:

a rotatable bushing having a cylindrical peripheral side, right and left sides, and a throughway extending between the right and left sides, the bushing situated about the landing gear input shaft so that the landing gear input shaft extends through the throughway;

a screw extending through the cylindrical peripheral side into the landing gear input shaft that secures the bushing to the input shaft so that the bushing rotates when the input shaft rotates, the bushing permitting the input shaft to rotate as well as be moved along its longitudinal axis by the gear shifter; and a nonrotating bushing support having left and right eyehole securing members at the left and right sides, respectively of the bushing that permit rotation of the bushing and the input shaft while confining the bushing in the longitudinal direction; and wherein the gear shifter means comprises:

a linear actuator, the linear actuator having a reciprocating piston, the piston having an elongated body with a movable working end and a driven end, the linear actuator is designed to move the driven end of the piston in a longitudinal direction generally parallel to the longitudinal axis of the landing gear input shaft; and means for mechanically connecting the movable working end of the piston to the input shaft so that the input shaft is movable along the longitudinal axis as the solenoid moves the combination of the linear shifting piston and the input shaft capture arm, wherein the connecting means for mechanically connecting comprises an input shaft capture arm that attaches the movable working end of the piston to the landing gear input shaft.

8. The system of claim 7, further comprising:

a lift motor that rotates the landing gear input shaft; and wherein the controller that is electrically coupled to the lift motor, the controller capable of causing the lift motor to rotate in first and second opposing rotational directions.

9. The system of claim 8, wherein the controller is designed to:

synchronize a motor shaft gear to the high or low gear of the landing gear by rotating the landing gear input shaft with the combination of the motor shaft gear and the motor until the gears bind but do not apply substantial lifting force to the landing gear; and while the landing gear input shaft is rotating or after the landing gear shaft has stopped rotating, moving the landing gear input shaft with the shifter in the longitudinal direction either inwardly or outwardly in order to shift between the high and low gears.

10. The system of claim 7, wherein the connecting means comprises a movable bracket being connected to the lift motor, the movable bracket being attached to the movable working end of the piston, the motor being connected to the input shaft, and wherein when the working end is moved with the linear actuator, the combination of the bracket, the lift motor, and input shaft are moved.

11. The system of claim 7, further comprising a gear shifter mount that mounts the gear shifter means to the platform and that prevents movement of the gear shifter means relative to the input shaft.

12. The system of claim 7, further comprising the platform with the landing gear with the telescoping jack leg for raising and lowering the front of the platform when the input shaft is rotated.

13. A system for longitudinally moving an input shaft associated with landing gear of a platform, the landing gear having a telescoping jack leg for raising and lowering a front of the platform when the input shaft is rotated, the landing gear having gears that are changed when the input shaft is moved along its longitudinal axis, the system comprising:

gear shifter means for moving the input shaft along its longitudinal axis; and a controller that is electrically coupled to the gear shifter means, the controller capable of causing the gear shifter means to move the landing gear input shaft in first and second opposing longitudinal directions in order to shift between the gears;

wherein the gear shifter means comprises:

a rotatable bushing having a cylindrical peripheral side, right and left sides, and a throughway extending between the right and left sides, the bushing situated about the landing gear input shaft so that the landing gear input shaft extends through the throughway;

a screw extending through the cylindrical peripheral side into the landing gear input shaft that secures the bushing to the input shaft so that the bushing rotates when the input shaft rotates, the bushing permitting the input shaft to rotate as well as be moved along its longitudinal axis by the gear shifter;

a solenoid actuator having a cylindrical throughway extending from a first side to a second side, the input shaft extending through and capable of rotation within the throughway, the solenoid actuator being mounted to a part of the landing gear and situated between a mounted location and the bushing; and wherein the input shaft is movable along its longitudinal axis by the solenoid actuator acting upon the input shaft within the throughway.

14. A system for longitudinally moving an input shaft associated with landing gear, the landing gear having a telescoping jack leg for raising and lowering a platform when the input shaft is rotated, the landing gear having gears that are changed when the input shaft is moved along its longitudinal axis, the system comprising:

a rotatable bushing having a cylindrical peripheral side, right and left sides, and a throughway extending between the right and left sides, the bushing situated about the landing gear input shaft so that the landing gear input shaft extends through the throughway;

a screw extending through the cylindrical peripheral side into the landing gear input shaft that secures the bushing to the input shaft so that the bushing rotates when the input shaft rotates, the bushing permitting the input shaft to rotate as well as be moved along its longitudinal axis by the gear shifter;

a solenoid actuator having a cylindrical throughway extending from a first side to a second side, the input shaft extending through and capable of rotation within the throughway, the solenoid actuator being mounted to a part of the landing gear and situated between a mounted location and the bushing; and wherein the input shaft is movable along its longitudinal axis by the solenoid actuator acting upon the input shaft within the throughway.

15. The system of claim 14, further comprising a lift motor that rotates the landing gear input shaft.

16. The system of claim 15, further comprising a controller that is electrically coupled to the lift motor and the linear actuator, the controller capable of causing the lift motor to rotate in first and second opposing rotational directions, the controller capable of causing the linear actuator to move the input shaft in first and second opposing longitudinal directions in order to shift between the gears.

17. The system of claim 14, further comprising a controller that is electrically coupled to the solenoid actuator, the controller capable of causing the solenoid actuator to move the input shaft in first and second opposing longitudinal directions in order to shift between the gears.

* * * * *